(No Model.)

J. P. BROWN.
SASH BALANCE.

No. 454,009. Patented June 9, 1891.

Witnesses.
George B Lewis
F. R. Sleeper.

Inventor.
John Pickett Brown,
by Chas. F. Sleeper,
Attorney.

UNITED STATES PATENT OFFICE.

JOHN PICKETT BROWN, OF SOUTH YARMOUTH, ASSIGNOR OF ONE-HALF TO GEORGE B. LEWIS, OF HYANNIS, MASSACHUSETTS.

SASH-BALANCE.

SPECIFICATION forming part of Letters Patent No. 454,009, dated June 9, 1891.

Application filed December 15, 1890. Serial No. 374,770. (No model.)

*To all whom it may concern:*

Be it known that I, JOHN PICKETT BROWN, a citizen of the United States, residing at South Yarmouth, in the county of Barnstable and State of Massachusetts, have invented certain new and useful Improvements in Window-Sash Balances, of which the following is a specification.

My invention relates to improvements in sash-balances constructed with a geared spring-wheel inclosed in a window-casing and engaging with a rack upon the sash; and it consists in combining with such wheels and racks means for forcing the gears into and holding them in the rack, together with means for adapting the tension of the spring operating the geared wheel to be readily and permanently increased.

Figure 1:
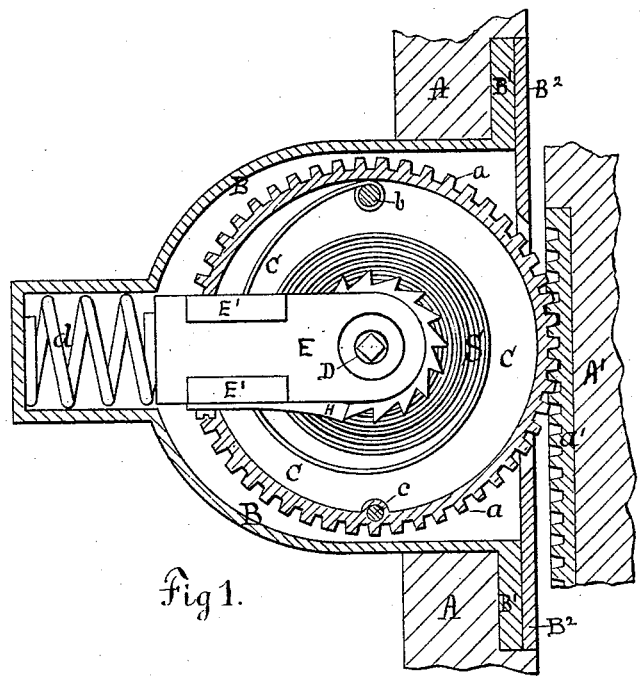
Figure 2:
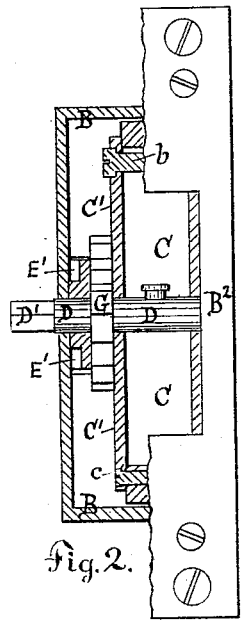
Figure 3:
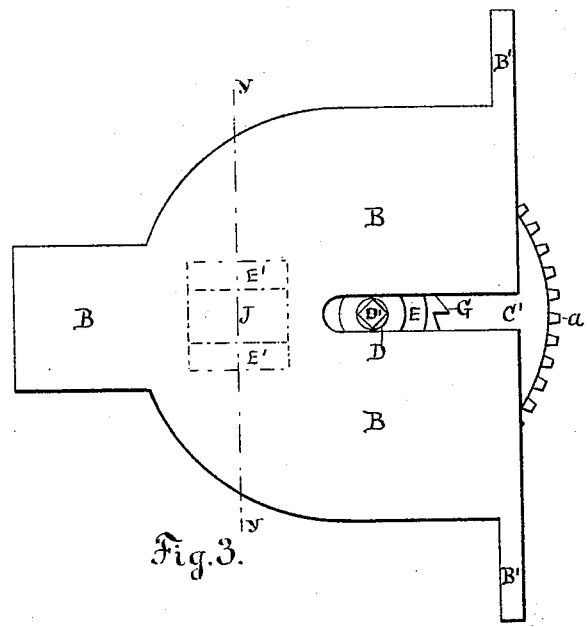
Figure 4:
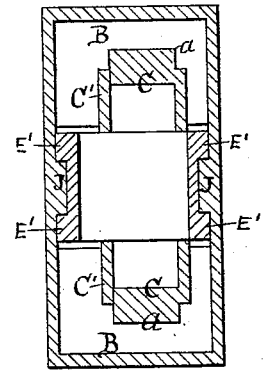

In the drawings I have shown, in Figure 1, a partly-sectional view of my invention. Fig. 2 shows a portion of the face-plate and vertical section with the spring omitted. Fig. 3 is a side view with the face-plate omitted, and Fig. 4 is a section on the line $y\ y$.

A represents a window-casing, and A' a sash. B is a case inserted in the window-casing, having flanges B', to which are secured a face-plate B². A wheel C is inclosed within the case A, said wheel being hollow and having gears $a$ upon its periphery fitted to engage with teeth upon a rack $a'$, secured to the sash. One of the sides of the wheel C is made removable to admit the insertion of a coiled spring S within the wheel, where said spring is fastened at one end to the axle D and at the other end to a screw $b$, which screw unites the two sides of the wheel. A screw $c$ also assists to hold the side C' to the wheel C. The axle D passes through the sides of the wheel C C' and is journaled in the ends of a yoke E. A ratchet-wheel G is secured to the axle D and a pawl H to the yoke E. One end of the axle is squared, as shown at D', to admit the use of a key for tightening the spring. The yoke E is provided with lugs E', which engage with ribs J on the inner side of the case B, as shown in Fig. 4 and in dotted lines in Fig. 3, and prevent it from wabbling. In the rear of the yoke E is a spring $d$, operating to force forward the yoke and its attachments, so that the wheel may gear into the rack. The side of the case B is slotted, as shown in Fig. 3, to admit the insertion and play of the axle D. The geared wheel C C' revolves freely upon the axle D, to which it is connected by the coiled spring $s$, its only other direct connection being with the rack $a'$ by means of the gears $a$.

When the wheel and its attachments are put into the case and the face-plate is put on, the whole is inserted in a window-casing. The sash, with its rack, is then put in, and as it is lowered the spring is wound around the axle, storing its power to assist in raising the sash; but as the spring is uncoiled when the rack is first engaged with the gears the power gained by lowering the sash is not adequate to that necessary to raise the sash to the height from which it was lowered and there balance it, and as the sash may be placed in the casing at varying heights, or when entirely down, in which case there could be little or no tension to the spring, I obtain the needful tension by means of a key placed upon the axle, by which the spring is wound upon the axle as much as may be necessary to balance the sash. I thereby prevent the axle from turning and uncoiling the spring by means of the ratchet-wheel G, secured to the axle D, and the pawl H, secured to the yoke E. After the window is in use should the spring be found too slack or should it become weakened with age its power can be increased by passing a key through the casing to the axle, winding it up, and again holding it by the pawl and ratchet. By this combination of a geared wheel and rack, a spring forcing the geared wheel into the rack, and a pawl and ratchet to hold the coiled spring after it has been wound by a key to the required tension I have perfected a sash-balance which is cheap, durable, easy of application, and better than any known to me.

I am aware that sash-balances having geared wheels engaged with racks and operated by coiled springs are not new; also, that such balances have been made with springs operating to keep the gears engaged with the rack, and also that pawls and ratchets are in common use to detain a coiled spring after it has been wound by a key, and these I do not claim separately.

What I claim as my invention, and desire to secure by Letters Patent, is—

In a sash-balance, the combination of a geared wheel revolving upon an axle, a coiled spring secured to the axle and to the wheel, a rack upon the window-sash, a spring operating to force the gears upon the wheel into the rack, and a ratchet-wheel attached to the axle, engaging with a pawl attached to the yoke, embracing the wheel and holding the axle, the pawl and ratchet being adapted to allow the coiled spring to be wound upon the axle by means of a key to keep the spring at the requisite tension, as described, and for the purpose specified.

JOHN PICKETT BROWN.

Witnesses:
CHAS. F. SLEEPER,
GEORGE B. LEWIS.